June 28, 1927.

M. J. PARSCH 1,634,051

HAT STRETCHER

Filed Oct. 16, 1922

Inventor:
Maxwell J. Parsch
By Barthel & Barthel
Attorneys

Patented June 28, 1927.

1,634,051

UNITED STATES PATENT OFFICE.

MAXWELL J. PARSCH, OF DETROIT, MICHIGAN.

HAT STRETCHER.

Application filed October 16, 1922. Serial No. 594,848.

This invention relates to devices of that class used for stretching hats for more closely conforming them to wearers' heads of varying size or shape, and has for its object to provide a simple, strong, durable, inexpensive and efficient device of this character.

Figure 1:
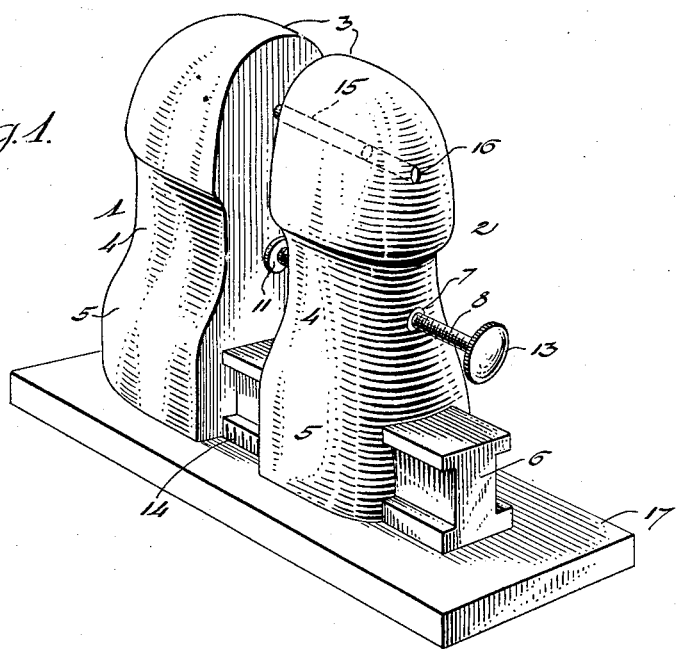
Figure 2:
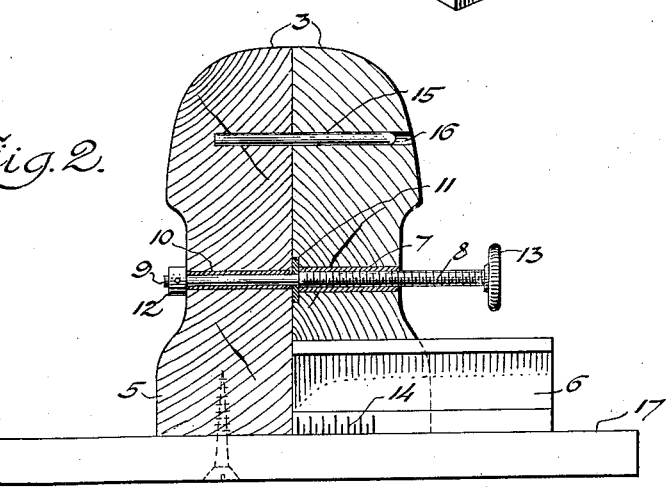

The invention will be described in the following specification having an appended claim clearly defining the novel features, and, with reference to the accompanying drawings, in which Figure 1 is a front perspective view of the improved hat stretcher, and Fig. 2 is a central longitudinal sectional view thereof.

This hat stretcher has two main half-blocks or parts 1, 2, each having a head or top portion 3, rounded at outer faces and directly operating upon a hat placed upon them to be stretched. Below these head portions 3, each block part 1, 2, has a narrowed body or waist portion 4, which merges into an enlarged base portion 5. The opposing faces of the parts 1, 2 are preferably parallel so that they may close against or closely approach each other, as shown in Fig. 2. A longitudinally extending guide 6 is fixed to the base 5 of the rear block part 1, and projects to slidably support and guide the front block part 2 as it moves toward or from the relatively fixed rear block part 1.

The parts 1, 2, 6, are preferably made of hard wood, and in the central body portion of the part 2 is fixed an internally threaded bushing 7 into which are fitted the external threads of a screw shaft 8, the rear end portion 9 of which is reduced in diameter and may rotate within a metal bushing 10 fixed in the central body portion of the rear block part 1. A washer 11 placed on the shaft portion 9, against an inner shoulder of the screw shaft 8, lies against the front plane face of the block part 1 and a nut or collar 12 fixed on the end of the shaft journal 9 lies against its rear face, thus preventing endwise movement of the screw shaft but allowing its free rotation within the bushing 10.

By grasping its hand wheel 13, the screw shaft 8—9, may be turned in opposite directions thereby causing the front block part 2 to move toward or from the rear part 1, to first relatively set the two block parts 1, 2, to adjust their rounded head portions 3, 3, approximately to the size of the hat to be stretched. The hat then is placed upon the two-part block and the screw shaft 8, 9 is turned to further separate the block parts 1, 2, and stretch the hat to the required extent which will be indicated by movement of the block part 2 along a graduated scale 14 of hat sizes marked or produced upon the guide 6. A dowel pin 15 fixed in the head portion of the rear immovable block part 1, enters a bore 16 made in the head portion of the front movable block portion 2, to form an upper guide coacting with the lower guide 6, to assure true movement of the block part 2 by the intermediately placed screw shaft while the hat is being stretched upon and by the rounded heads 3, 3, of the two block parts 1, 2.

The base 5 of the rear block part 1, with its projecting guide 6, may together form a support for the entire stretcher device upon a counter or table, but this part 5 may be fixed to any suitable base board 17, which will support the device upon a counter or table to which the board may be fastened in any desired manner.

The simple and well balanced construction of this hat stretching device assures its inexpensiveness, and its durability, and its permanent efficiency in use.

I claim as my invention:

A hat stretcher comprising a base, a guide extending longitudinally of said base, a block fixed on said base at one end of said guide, a block slidable on said guide to and from said fixed block, said blocks having head and waist portions, a screw shaft disposed parallel to said guide and having one end held rotatably in the waist portion of the fixed block and the opposite end in screwthreaded engagement with the waist portion of the slidable block, and a dowel pin carried by the head of the fixed block and adapted to enter the head of the slidable block.

In testimony whereof I affix my signature.

MAXWELL J. PARSCH.